UNITED STATES PATENT OFFICE.

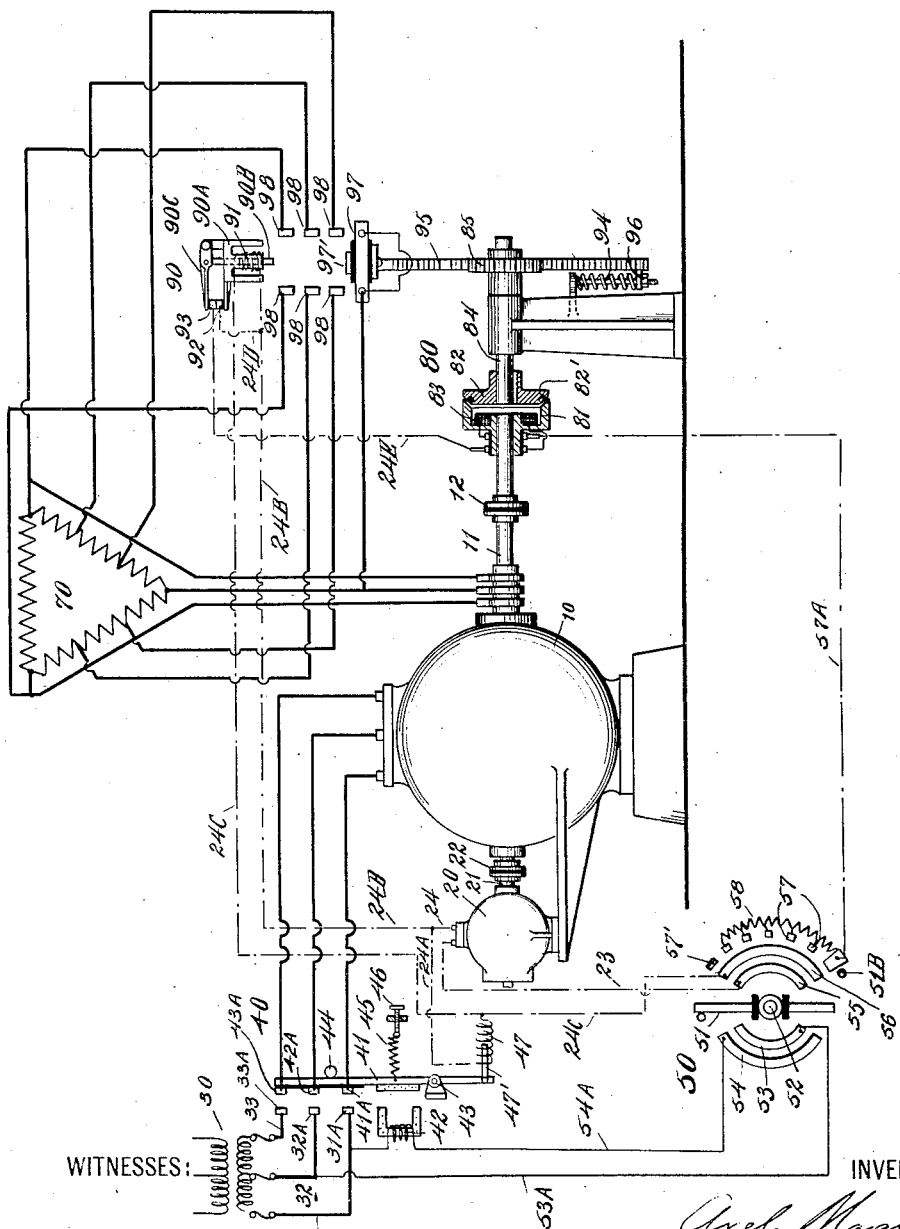

AXEL MAGNUSON, OF NEW YORK, N. Y., ASSIGNOR, BY MESNE ASSIGNMENTS, TO OTIS ELEVATOR COMPANY, OF JERSEY CITY, NEW JERSEY, A CORPORATION OF NEW JERSEY.

SYSTEM OF MOTOR CONTROL.

No. 816,930.     Specification of Letters Patent.     Patented April 3, 1906.

Application filed June 13, 1905. Serial No. 264,982.

*To all whom it may concern:*

Be it known that I, AXEL MAGNUSON, a citizen of the United States, and a resident of New York city, in the county of New York and State of New York, have invented certain new and useful Improvements in Systems of Motor Control, of which the following is a specification.

My invention relates to a system of motor control; and it consists of a novel arrangement of various apparatus and circuits whereby an electric motor may be started, stopped, and otherwise controlled at will.

Although my system is applicable to other types of electric motors, it may be used to great advantage in conjunction with such motors as are operated by alternating currents.

I have made application for Letters Patent, Serial No. 241,592, filed January 18, 1905, for a system of motor control which embodies the broad idea of the present invention, and the present invention is of certain improvements and developments of the invention disclosed in said prior application.

The drawing shows diagrammatically the various apparatus and circuits which I use in carrying out my invention.

10 designates a motor which is to be controlled. In the drawing it is shown as an alternating-current motor.

20 is a direct-current generator, which is driven by the motor. It may be directly connected to the motor by having its shaft 21 connected to the motor-shaft 11 by a coupling 22, as shown in the drawing, or it may be connected to run with the motor in any other suitable manner.

30 designates a transformer, the primary of which may be connected to a suitable source of electrical supply. Its secondary is connected by conductors 31, 32, and 33 to stationary contacts $31^A$, $32^A$, and $33^A$, which are a part of a magnetically-actuated circuit-closer 40, and by other conductors to other parts of the apparatus.

50 designates a manually-operated circuit-closer or switch, which may be situated in any convenient place and by means of which the movements of the motor may be controlled. This switch 50 comprises a movable contact-arm 51, which is pivoted at 52 and is divided into two parts, which are insulated from each other. The lower part is adapted to be moved onto two segmental contact-plates 53 and 54 and to bridge them, and thereby electrically connect them. The plate 53 is connected to the main 32 by a conductor $53^A$. The plate 54 is connected to the main 31 through the winding of an electromagnet 42 by a conductor $54^A$. When the contact-arm 51 is moved onto these two plates, a circuit will be closed through the magnet 42, and the latter will be energized by a single-phase current, because connected between two of the mains. This magnet 42 is a part of the magnetically-actuated circuit-closer 40, which I will now describe more fully. It comprises an arm 41, which is pivoted at 43 and which is normally held back against a stop 44, as shown in the drawing, by a spring 45, the tension of which may be adjusted by means of a threaded screw 46. The upper end of the pivoted arm carries three insulated contacts $41^A$, $42^A$, and $43^A$, which are connected by suitable conductors to the stator of the motor 10.

47 designates a direct-current electromagnet, which is arranged to coöperate with the magnet 42 in a manner which will be described later. Now when the magnet 42 is energized it will attract the arm 41 and cause its contacts $41^A$, $42^A$, and $43^A$ to be moved against the stationary contacts $31^A$, $32^A$, and $33^A$, respectively, and consequently will cause the motor 10 to be connected to the mains 31, 32, and 33. The motor will therefore begin to rotate slowly. The generator 20, which is connected to run with the motor, will now be driven by the motor and will tend to generate a direct current which will be proportional in strength to the speed of the motor. In the drawing the direct-current circuits are shown by light lines composed of dots and dashes. One of the leads 23 from the generator is connected to a segmental contact-plate 55 in the switch 50. The other lead 24 extends through a conductor $24^A$, through the winding of magnet 47, and thence through conductor $24^C$ to contact-plate 56 in the switch. The conductor $24^C$ also extends to the winding of a magnet 91 and back to the lead 24 through a conductor $24^B$.

It will be noted that when the lower part of the pivoted contact-arm 51 is moved onto the contact-plates 53 and 54 its upper end is moved onto contact-plates 55 and 56 and also onto a series of contacts 57, which are connected together through a resistance 58.
When the contact-plates 55 and 56 are thus connected, magnets 47 and 91 will be connected across the mains of the generator 20 and will be energized thereby. The core 47' of magnet 47 is connected to the lower end of the pivoted arm 41 of the circuit-closer 40, and will therefore hold its contacts firmly together and prevent the chattering so common in alternating-current apparatus of this kind.
It will be seen that an opposition element is interposed in the rotor-circuit of the motor in the form of a star-connected resistance 70. This opposition element may be resistance or inductance or any other desired arrangement which may be used to prevent too great a flow of current. When the motor is started, all of this resistance is preferably inserted in the rotor-circuit. The motor will not then get full power at once, but will begin to rotate slowly. The resistance should then be cut out of the circuit gradually in order to give the motor the proper acceleration. I will now describe my improved method of accomplishing this result.
A magnetic clutch 80 is arranged to have one of its elements 81 driven by the motor. This may be accomplished in a number of ways—as, for example, by connecting it directly to the motor-shaft 11 by a coupling 12, as shown. The other element 82 of the clutch is attached to a shaft 84, which carries a gear 85, which is also secured to the shaft. The clutch is provided with a winding 83, which is arranged to be energized by the current from the generator 20 either directly or through the resistance 58. If the operator turns the contact-arm around to its extreme position, which is limited by a stop 51ᴮ, all of the resistance 58 will be cut out thereby and the clutch - winding 83 will be connected directly across the generator 20 by the following conductors: conductor 23 to contact-plate 55, contact-arm 51 to lower contact 57, conductor 57ᴬ to the clutch-winding 83, through the latter, and thence by conductor 24ᴱ to contacts 92 and 93, which are closed, thence through conductors 24ᴰ, 24ᴮ, and 24 to the other terminal of the generator. The clutch will thus be energized by the direct current and will cause its second element 82 and the gear 85 to rotate. There may be considerable slip between the two parts of the clutch 80, especially when the direct current is weak. This is a desirable feature, as the part of the operation which I am about to describe should not be made too rapidly, but should be proportional to the acceleration of the motor, which of course will vary with different loads. The gear 85 meshes with a rack 95, which is normally held down by a spring 94, which may be adjusted by nuts 96. The upper end of the rack carries a contact-arm 97, which is connected to the resistance 70 and is adapted to be moved up over a series of stationary contacts 98 98 by the gear 85. These contacts 98 98 are also connected to the resistance 70. As the arm 97 gradually moves up over the contacts 98 98 it short-circuits the resistance 70 in a number of steps, and thereby allows the motor to rotate more rapidly. The action of the clutch, and therefore the movement of the contact-arm, depends upon the strength of the generated direct current, and as the strength of this generated current depends upon the speed of the controlled motor it is evident that the acceleration of the motor will be controlled automatically by this arrangement in the desired way—that is, its acceleration will be rapid when it is driving light loads and slower with heavier loads.

I will now show the purpose and operation of the holding device 90, which is above the stationary contacts 98 98. The magnet 90ᴬ is energized by current from the generator 20, as has been shown. Now when the contact-arm has been raised to its upper position the upper part 97' of this arm, which is made of magnetic material, comes in contact with this magnet and is held thereby. At the same time the part 97' strikes a projecting rod 90ᴮ and raises a pivoted arm 90ᶜ. This raises contact 93 from contact 92 and breaks the circuit through the clutch-winding 83, which will deënergize the clutch. The parts will then remain in the position just described until switch 50 is moved back to stop the motor, when the circuit to magnet 91 will be broken and the parts be returned to the position shown in the drawing.

The resistance 58 is provided in the manually-operated switch for the purpose of allowing the operator to throw more or less of this resistance into the circuit with the clutch-winding 83, and thus give the operator complete control of the clutch. He may thereby retard its action, but cannot increase its rapidity of motion. The last contact 57' is not connected to the resistance 58, so that, if desired, the operator may cause the other parts of the apparatus to be actuated without energizing the clutch and operating the parts it controls.

The member 82 of the clutch may be arranged to slide laterally upon its shaft, and I have shown at 82' a lubricating means for the clutch, which may be sticks of graphite. The current may be led to the winding 83 by means of slip-rings in the usual manner.

The drawing shows no means for reversing the motor; but this may be readily added if the motor is to be used to drive an elevator, a railroad-car, or other apparatus in which reversal is required. Means for reversing were shown in my prior application cited. The drawing shows the clutch as arranged to control a resistance. It may of course be arranged to actuate any other desired form of motor-controlling device.

Different controlling devices are commonly used, especially with diferent types of electric motors.

This invention is applicable to many types of motors in conjunction with many types of controlling devices.

What I claim is—

1. A motor, a controlling device therefor, a generator connected to run with the motor, means dependent upon the action of the generator for causing the movement of the motor to actuate the controlling device.

2. A motor, a controlling device therefor, a generator connected to run with the motor, an electromagnetic clutch dependent upon the action of the generator arranged to cause the controlling device to be actuated by the movement of the motor.

3. A motor, a controlling device therefor, a generator connected to run with the motor arranged to generate a current proportional in strength to the speed of the motor, an electromagnetic clutch energized by said generated current and arranged to cause the controlling device to be actuated by the movement of the motor.

4. A motor, a controlling device therefor, a generator connected to run with the motor arranged to generate a current proportional in strength to the speed of the motor, an electromagnetic clutch energized by said generated current and arranged to cause the controlling device to be actuated by the movement of the motor and in proportion to the strength of the generated current.

5. A motor, a controlling device therefor, a generator driven by the motor arranged to generate a variable voltage in proportion to the speed of the motor, a rotating member, means for driving said rotating member, a second rotating member connected to the controlling device, and electromagnetic means actuated by the variable voltage for imparting motion from said first rotating member to said second rotating member.

6. A motor, a controlling device therefor, a generator driven by the motor arranged to generate a variable voltage in proportion to the speed of the motor, a rotating member, means for driving said rotating member, a second rotating member connected to the controlling device, and electromagnetic means actuated by the variable voltage for imparting motion from said first rotating member to said second rotating member in proportion to the variable voltage.

7. A motor, a controlling device therefor, a generator connected to run with the motor, an electromagnetic clutch dependent upon the action of the generator arranged to cause the controlling device to be actuated by the movement of the motor, and means for retarding the effect of the clutch on the controlling device.

8. A motor, a controlling device therefor, a generator connected to run with the motor, an electromagnetic clutch dependent upon the action of the generator arranged to cause the controlling device to be actuated by the movement of the motor, and adjustable means for retarding the effect of the clutch on the controlling device.

9. A motor, a controlling device therefor, a generator connected to run with the motor, an electromagnetic clutch dependent upon the action of the generator arranged to cause the controlling device to be actuated by the movement of the motor to automatically control the acceleration of the motor in starting, and means for holding the controlling device while the motor is running.

10. A motor, a controlling device therefor, a generator connected to run with the motor, means dependent upon the action of the generator for actuating the controlling device, and means for cutting out said first means after the controlling device has been actuated.

11. A motor, a controlling device therefor, a generator connected to run with the motor, means dependent upon the action of the generator for actuating the controlling device, means for cutting out said first means after the controlling device has been actuated, and a magnetic holding device arranged to hold the controlling device while the motor is running.

12. A motor, a controlling device therefor, a generator connected to run with the motor, means dependent upon the action of the generator for actuating the controlling device, means for cutting out said first means after the controlling device has been actuated, and a magnetic holding device deriving current from the generator arranged to hold the controlling device while the motor is running.

13. A motor, a controlling device therefor, a generator connected to run with the motor, an electromagnetic clutch dependent upon the action of the generator arranged to cause the controlling device to be actuated by the movement of the motor, and means for cutting out the clutch after the controlling device has been actuated.

14. A motor, a controlling device therefor, a generator connected to run with the motor, an electromagnetic clutch dependent upon the action of the generator arranged to cause the controlling device to be actuated by the movement of the motor to automatically control the acceleration of the motor in starting, means for cutting out the clutch after the controlling device has been actuated, and means for holding the controlling device while the motor is running.

15. A motor, a controlling device therefor, a generator connected to run with the motor, an electromagnetic clutch dependent upon the action of the generator arranged to cause the controlling device to be actuated by the movement of the motor, and a circuit-closer for the motor.

16. A motor, a controlling device therefor, a generator connected to run with the motor, an electromagnetic clutch dependent upon the action of the generator arranged to cause the controlling device to be actuated by the movement of the motor, and a circuit-closer for the motor actuated by alternating currents.

17. A motor, a controlling device therefor, a generator connected to run with the motor, an electromagnetic clutch dependent upon the action of the generator arranged to cause the controlling device to be actuated by the movement of the motor, and a circuit-closer for the motor actuated by alternating currents and held by direct currents.

18. A motor, a controlling device therefor, a generator connected to run with the motor, an electromagnetic clutch dependent upon the action of the generator arranged to cause the controlling device to be actuated by the movement of the motor, and a circuit-closer for the motor controlled by alternating and direct currents.

19. A motor, a controlling device therefor, a generator connected to run with the motor, an electromagnetic clutch dependent upon the action of the generator arranged to cause the controlling device to be actuated by the movement of the motor, a circuit-closer for the motor, and a manually-operated switch.

20. A motor, a controlling device therefor, a generator connected to run with the motor, means dependent upon the action of the generator for actuating the controlling device, and a manually-operated device for regulating said means.

21. A motor, a controlling device therefor, a circuit-closer for the motor, a generator driven by the motor and arranged to generate a variable voltage in proportion to the speed of the motor, means dependent upon said voltage for actuating the controlling device, and a manually-operated switch for controlling the circuit-closer and regulating the actuating means for the controller.

22. A motor, a controlling device therefor, a circuit-closer for the motor, a generator driven by the motor and arranged to generate a variable voltage in proportion to the speed of the motor, means dependent upon said voltage for actuating the controlling device, and a manually-operated switch for controlling the circuit-closer and regulating the actuating means for the controller.

23. A motor, a controlling device therefor, a circuit-closer for the motor, a generator driven by the motor and arranged to generate a variable voltage in proportion to the speed of the motor, an electromagnetic clutch dependent upon the variable voltage for causing the controlling device to be actuated by the movement of the motor but in proportion to said voltage, and a manually-operated switch for controlling the circuit-closer and for regulating the strength of the clutch.

24. A motor, a controlling device therefor, a circuit-closer for the motor, a generator driven by the motor and arranged to generate a variable voltage in proportion to the speed of the motor, an electromagnetic clutch dependent upon the variable voltage for causing the controlling device to be actuated by the movement of the motor but in proportion to said voltage, lubricating means for the clutch, and a manually-operated switch for controlling the circuit-closer and for regulating the strength of the clutch.

25. A motor, a starting-switch therefor, a generator connected to run with the motor, an electromagnetic clutch in circuit with the generator so arranged that its strength will be proportional to the speed of the motor and generator, means for closing the circuit of the clutch, and automatic means for opening the circuit of the clutch while the motor is running.

26. A motor, a starting-switch therefor, a generator connected to run with the motor, an electromagnetic clutch in circuit with the generator so arranged that its strength will be proportional to the speed of the motor and generator, automatic means for opening the circuit of the clutch while the motor is running and manually-operated means for closing, regulating and opening said circuit.

27. A pulsating current-motor, an external source of alternating-current supply of practically constant value, for starting and running the motor, a generator driven by the motor and arranged to generate a direct current proportional in strength to the speed of the motor, a clutch having a winding in circuit with said generator, arranged to be magnetized thereby, the strength of such magnetization being proportional to that of the generated current, and automatic means for opening the clutch-circuit when the current in said circuit has risen to a predetermined strength.

In testimony whereof I have signed my name to this specification in the presence of two subscribing witnesses.

AXEL MAGNUSON.

Witnesses:
ERNEST W. MARSHALL,
JOSEPH E. CAVANAUGH.